(12) United States Patent
Claussen et al.

(10) Patent No.: US 9,319,995 B2
(45) Date of Patent: Apr. 19, 2016

(54) PROACTIVE UPLINK TRANSMIT POWER INCREASE IN SMALL CELLS UPON OUTBOUND HANDOVERS

(71) Applicant: Alcatel Lucent, Boulogne Billancourt (FR)

(72) Inventors: Holger Claussen, Straffan (IE); Rouzbeh Razavi, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/385,320

(22) PCT Filed: Mar. 14, 2013

(86) PCT No.: PCT/EP2013/055201
§ 371 (c)(1),
(2) Date: Sep. 15, 2014

(87) PCT Pub. No.: WO2013/135797
PCT Pub. Date: Sep. 19, 2013

(65) Prior Publication Data
US 2015/0065135 A1 Mar. 5, 2015

(30) Foreign Application Priority Data

Mar. 16, 2012 (EP) .................................... 12305312

(51) Int. Cl.
*H04W 52/24* (2009.01)
*H04W 36/00* (2009.01)
(Continued)

(52) U.S. Cl.
CPC .......... *H04W 52/24* (2013.01); *H04W 36/0083* (2013.01); *H04W 52/40* (2013.01);
(Continued)

(58) Field of Classification Search
CPC .......................... H04W 52/24; H04W 36/0083
USPC .................................................. 455/436, 522
See application file for complete search history.

(56) References Cited

U.S. PATENT DOCUMENTS 8,666,416 B2  3/2014  Mori
8,838,107 B2  9/2014  Hwang et al.
(Continued)

FOREIGN PATENT DOCUMENTS

JP     H-09289670     11/1997
JP     2009-065693    3/2009
(Continued)

OTHER PUBLICATIONS

"3$^{rd}$ Generation Partnership Project; Technical Specification Group Radio Access Network; Physical layer procedures (FDD); (Release 8)," 3GPP TS 25.214 V8.13.0, XP050561755, pp. 1-95, (Mar. 2012).
(Continued)

*Primary Examiner* — Leon Flores
(74) *Attorney, Agent, or Firm* — Fay Sharpe LLP

(57) ABSTRACT

The present invention relates to a method and an apparatus for controlling the transmit power of a mobile station (UEX) served by a small cell (C1). In accordance with an embodiment of the invention, the method comprises the steps of, and the apparatus comprises means for, detecting a measurement event anticipating the forthcoming fulfillment of a handover condition towards a neighboring macro cell (C2) by the mobile station, and thereupon step-wise increasing the transmit power level of the mobile station so as to reach a transmit power target (P_Target) when the handover condition is eventually fulfilled by the mobile station. The transmit power target is for compensating for an estimated downlink path loss for the mobile station in the macro cell. The apparatus typically forms part of a radio access point (100) configured to operate the small cell, such as a femto base station to be operated in residential or business premises, or a pico, metro or micro base station to provide increased capacity in a targeted area of data traffic concentration.

12 Claims, 5 Drawing Sheets

(51) Int. Cl.
*H04W 52/40* (2009.01)
*H04W 52/14* (2009.01)
*H04W 52/12* (2009.01)
*H04W 52/36* (2009.01)

(52) U.S. Cl.
CPC ............ *H04W 52/12* (2013.01); *H04W 52/146* (2013.01); *H04W 52/242* (2013.01); *H04W 52/245* (2013.01); *H04W 52/362* (2013.01)

(56) References Cited

U.S. PATENT DOCUMENTS

| | | | |
|---|---|---|---|
| 2002/0187784 | A1* | 12/2002 | Tigerstedt et al. ............ 455/439 |
| 2003/0171124 | A1 | 9/2003 | Kataoka |
| 2004/0102195 | A1* | 5/2004 | Naghian et al. ............ 455/456.1 |
| 2011/0039561 | A1 | 2/2011 | Narasimha et al. |
| 2011/0070881 | A1* | 3/2011 | Hwang et al. ................. 455/423 |
| 2011/0244866 | A1 | 10/2011 | Yamamoto et al. |
| 2013/0039341 | A1 | 2/2013 | Kim et al. |
| 2013/0109384 | A1 | 5/2013 | Abe et al. |

FOREIGN PATENT DOCUMENTS

| | | |
|---|---|---|
| JP | 2011-216936 | 10/2011 |
| JP | 2011-238981 | 11/2011 |
| KR | 10-2010-0059300 | 6/2010 |
| WO | WO 02/104056 | 12/2002 |
| WO | WO 2009/142445 | 11/2009 |
| WO | WO 2011/011637 | 1/2011 |
| WO | WO 2011/054374 A1 | 5/2011 |
| WO | WO 2011/070643 | 6/2011 |
| WO | WO 2011/099782 | 8/2011 |

OTHER PUBLICATIONS

International Search Report for PCT/EP2013/055201 dated May 27, 2013.

Lee, et al., "Easy Explanation of 3G/4G Mobile Communication System" revised edition, Aug. 30, 2009. (English translation unavailable).

* cited by examiner

PROACTIVE UPLINK TRANSMIT POWER INCREASE IN SMALL CELLS UPON OUTBOUND HANDOVERS

TECHNICAL FIELD OF THE INVENTION

The present invention relates to a method and apparatus for controlling the transmit power of a mobile station served by a small cell.

TECHNICAL BACKGROUND OF THE INVENTION

With the ever-increasing data traffic demand in today's mobile networks, immediate solutions for capacity improvement are sought by the operators. Thanks to higher spatial reuse of spectrum, short-radius cells in the range of 50 to 100 meters appear as a promising solution to satisfy bandwidth extensive traffic demands and to enhance the Quality of Experience (QoE) of mobile users.

Heterogeneous Networks (HetNet) are now being deployed, where cells of smaller footprint size (so-called pico, metro or micro cells) are embedded within the coverage area of larger umbrella cells (so-called macro cells), primarily to provide increased capacity in targeted areas of data traffic concentration. HetNet try to exploit the spatial variation in user and traffic distribution to efficiently increase the overall capacity of mobile networks.

Also, with up to 80 percent of the traffic being originated from the indoor where the current mobile networks are least effective due to high buildings penetration losses, indoor data offloading has become a focus of the industry in the recent years. The indoor data offloading incentive is significant firstly due to the successful penetration and the maturity of the fixed broadband technology that can be re-used for mobile network backhauling, and secondly because of the substantial cellular network resources that are expended on penetrating buildings. One attractive solution to offload indoor users' traffic is to deploy femto cells (or home cells). Femto cells are short-range cells operated by subscriber-owned radio access points, and provides improved indoor coverage and increased throughput to home users while off-loading traffic from expensive macro radio access onto the low-cost public Internet.

Seamless handovers between macro and femto cells is considered as one of the major advantages of femto cell technology when compared against other alternative offloading solutions such as Wifi-based solutions. However, there are some issues that need to be addressed to assure smooth and successful users' handover from femto to macro cells.

Generally speaking, there are two types of handovers: hard and soft handovers. In hard handover the channel in the source cell is released and only then the channel in the target cell is engaged. Thus the connection to the source is broken before the connection to the target is made. For this reason such handovers are also known as break-before-make handovers. On the other hand a soft handover is one in which the channel in the source cell is retained and used for a while in parallel with the channel in the target cell. In this case the connection to the target is established before the connection to the source is broken, hence these handovers are called make-before-break handovers.

Before explaining the details and respective issues associated to each handover mode, the uplink power control algorithms used in Wideband Code Division Multiple Access (WCDMA) mobile networks is briefly discussed.

For each activated uplink frequency, the uplink inner-loop power control adjusts the User Equipment (UE) transmit power in order to keep the received uplink Signal to Noise and Interference Ratio (SNIR) on that frequency at a given SNIR target, SNIR_Target. The base station should estimate the SNIR SNIR_Estimate of the received uplink Dedicated Physical Control CHannel (DPCCH). The base station should then generate Transmit Power Control (TPC) commands and transmit the commands once per slot (i.e., once every 0.66 ms) according to the following rule: if SNIR_Estimate>SNIR_Target then the TPC command to transmit is "0", while if SNIR_Estimate<SNIR_Target then the TPC command to transmit is "1".

Per 3GPP TS 25.214, there are two algorithms for uplink power control. Each algorithm defines how the TPC commands ought to be interpreted and combined (when received from multiple base stations). In summary, algorithm 2 is more stable compared to algorithm 1 in a sense that it considers five consecutive time slots before making a judgment regarding a change of the transmit power, but is consequently slower than algorithm 1. Also, during the soft handover regime, the UE receives TPC commands from all the cells that it is attached to. However, and regardless of the power control algorithm being used, the TPC combining process is very conservative in a sense that it gives precedence to the base station requiring the lowest uplink transmit power and yielding the least interference.

In hard handover, after the UE establishes its connection to the target cell, it adjusts its transmit power using the open loop power control to estimate the required transmission power for communication with the target cell. The UE's initial transmission consists only of the DPCCH transmission. Per 3GPP TS 25.331 s8.5.3, the UE determines its initial DPCCH transmit power, based on the Received Signal Code Power (RSCP) of the pilot channel (CPICH):

$$\text{DPCCH\_Initial\_power} = \text{DPCCH\_Power\_offset} - \text{CPICH\_RSCP} \quad (1)$$

The test set signals a value for DPCCH_Power_offset that places the UE's initial transmission near the UE target power setting. The UE target power setting is the level that is set for the UE's DPCCH and Dedicated Physical Data CHannel (DPDCH) transmission. Thus, the test set places the initial transmit power of the UE's DPCCH slightly lower than the UE target power setting so that when the DPDCH is turned on, the total UE power matches the UE target power setting.

In classical macro cell deployments, this way of UE's power adjustment is not problematic because firstly the UE's transmit power is not expected to change significantly after the handover as the UE is located at the edges of the two cells far from both antennas (and most likely has been already transmitting on high power to communicate to its previous serving cell). Additionally, as the macro cells normally serve larger number of users (compared to the femto cells), the changes in the transmission power of one single user can not affect the overall uplink interference level of other users noticeably. Unfortunately, this is not the case when considering hard handovers from femto to macro cells operated in the same frequency band (or in overlapping frequency bands). Since macro base station is located at much further distance than the femto base station, the required uplink transmission power to reach the macro base station is significantly higher than the uplink power of the femto cell users. This implies that when the handover is performed, the UE needs to substantially increase its transmit power level so as to communicate with the macro cell. This abrupt and significant change of the transmit power introduces a sudden drop of the SNIR for the other femto cell user(s).

The aforementioned closed-loop power control mechanisms assures that the other femto cell user(s) can sustain the required SNIR at the femto base station despite the changes of the radio channel such as signal fast fades due to users' mobility. However, with the very abrupt and significant drop of the SNIR, it might take long until the appropriate transmission power level is reached. This is especially true when considering multiple users simultaneously increasing their transmission power (which adds to the overall interference level). The case is drastically worst if the aforementioned algorithm 2 is used for transmit power control. Therefore, there is potentially a risk of call drops during the adaptation of the users' transmission power. Even if the call could be maintained, at least severe drop of users' QoE is expected.

Soft handovers may be used too in future femto cells deployment. During the soft handover regime, the UE receives TPC commands from all the cells that it is attached to. However, regardless of the power control algorithm being used, the TPC combining process is very conservative since it is sufficient if the user can at least communicate to one of the base stations. Again this is not a problem for traditional macro cell to macro cell handovers as the required transmission power from the edge of one cell to another cell is not varied substantially. However this is not the case when it comes to soft handovers from femto to macro cells as the user would normally need to transmit with considerably higher power to reach the macro base station. In this case, the TPC command coming from the femto base station during the soft handover regime would keep the user's transmission power low and therefore the user would have difficulty adapting the power quickly enough when he is fully switched to the macro cell (after the handover completes normal power control is used to adapt the transmission power of the user). Again the case is even worse if the aforementioned algorithm 2 is used for transmit power control.

SUMMARY OF THE INVENTION

It is an object of the present invention to improve user mobility from femto, pico, metro or micro cells (further referred to as small cells) to macro cells, and to palliate the above shortcomings and drawbacks of the prior art.

In accordance with a first aspect of the invention, a method for controlling the transmit power of a mobile station served by a small cell comprises the steps of detecting a measurement event anticipating the forthcoming fulfillment of a handover condition towards a neighboring macro cell by the mobile station, and thereupon step-wise increasing the transmit power level of the mobile station so as to reach a transmit power target when the handover condition is eventually fulfilled by the mobile station.

In accordance with another aspect of the invention, a transmit power controller for controlling the transmit power of a mobile station served by a small cell, and configured to detect a measurement event anticipating the forthcoming fulfillment of a handover condition towards a neighboring macro cell by the mobile station, and thereupon step-wise increasing the transmit power level of the mobile station so as to reach a transmit power target when the handover condition is eventually fulfilled by the mobile station.

The transmit power controller preferably forms part of a radio access point configured to operate the small cell, such as a femto, pico, metro or micro base station.

In one embodiment of the invention, the handover condition is a condition whereby the macro cell is measured as being offset better than the small cell by a first positive handover offset, thereby yielding a reference receive signal strength or quality threshold in the small cell for handover towards the macro cell, and the measurement event is a measurement event whereby a current receive strength or quality level for the mobile station in the small cell was measured as being below a handover anticipation threshold which is the sum of the reference receive signal strength or quality threshold and a second positive anticipation offset.

In one embodiment of the invention, the transmit power target is for compensating for an estimated downlink path loss for the mobile station in the macro cell.

In one embodiment of the invention, the transmit power target is determined by measuring a receive signal strength of a reference pilot signal broadcast within the macro cell at a nominal downlink transmit power.

In one embodiment of the invention, the step-wise increase of the transmit power is a monotonically-decreasing function of a current receive strength or quality level for the mobile station in the small cell.

In one embodiment of the invention, the step-wise increase of the transmit power corresponds to a linear power increase from an initial transmit power used by the mobile station in the small cell when the measurement event is detected up to the transmit power target.

In an alternative embodiment of the invention, the step-wise increase of the transmit power corresponds to a second or higher order polynomial power increase from an initial transmit power used by the mobile station in the small cell when the measurement event is detected up to the transmit power target.

In one embodiment of the invention, the increase of the transmit power level for the mobile station is withdrawn if no handover towards the macro cell took place for the mobile station during a handover confirmation time period triggered upon detection of the measurement event.

The present invention proposes to proactively adapt the power of the small cell users which are likely to have a handover towards the macro cell soon. A forthcoming handover event towards a neighboring macro cell is anticipated for a particular UE served by the small cell, and the uplink transmit power level of the UE in the small cell is gradually increased in such a way that an uplink transmit power target is in force when the handover towards the macro cell eventually takes place.

Typically, the downlink receive power/quality level in the small cell at which a handover condition towards the macro cell is fulfilled for a particular UE is known by means of UE measurement reports. This downlink receive power/quality level varies across UEs and from one handover location to another. By averaging this downlink receive power/quality level across multiple UEs, one determines a reference downlink power/quality threshold for outbound handovers towards the macro cell. This reference threshold can be used in combination with an anticipation offset to anticipate an upcoming handover event and to start increasing the UE transmit power before the actual handover occurrence.

The anticipation offset and the transmit power target are designed so as to reduce the uplink transmit power disruption upon handover execution, and to enable the other small cell user(s) to gradually adapt their uplink transmit power level to cope with this interference increase and to maintain the required SNIR and hence the call quality.

The transmit power target value is determined so as to compensate for an estimate of the downlink path loss incurred by the UE within the macro cell upon handover execution.

The transmit power target can be determined by measuring the receive signal strength of a reference pilot signal broadcast within the macro cell at a nominal downlink transmit power.

This pilot signal can be measured by the UE upon detection of the handover condition, thereby yielding a rather accurate measure of the downlink path loss when handover towards the macro cell takes place, and thus a rather accurate uplink transmit power target that will avoid any substantial uplink transmit power disruption when the UE eventually switches to the macro cell.

Alternatively, the pilot signal can be directly measured by the small base station operating the small cell, which is a sub-optimal yet still advantageous solution.

Typically, the transmit power increase is a function of a current receive strength or quality level for the mobile station in the small cell. The transmit power increase can be a linear increase or a polynomial/exponential increase from an initial uplink transmit power level up to the uplink transmit power target that is to be achieved.

If no handover towards the macro cell takes place for the UE during a handover confirmation period, then this ad-hoc transmit power increase is withdrawn, and the legacy uplink power control algorithm is restored in the small cell for that UE.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
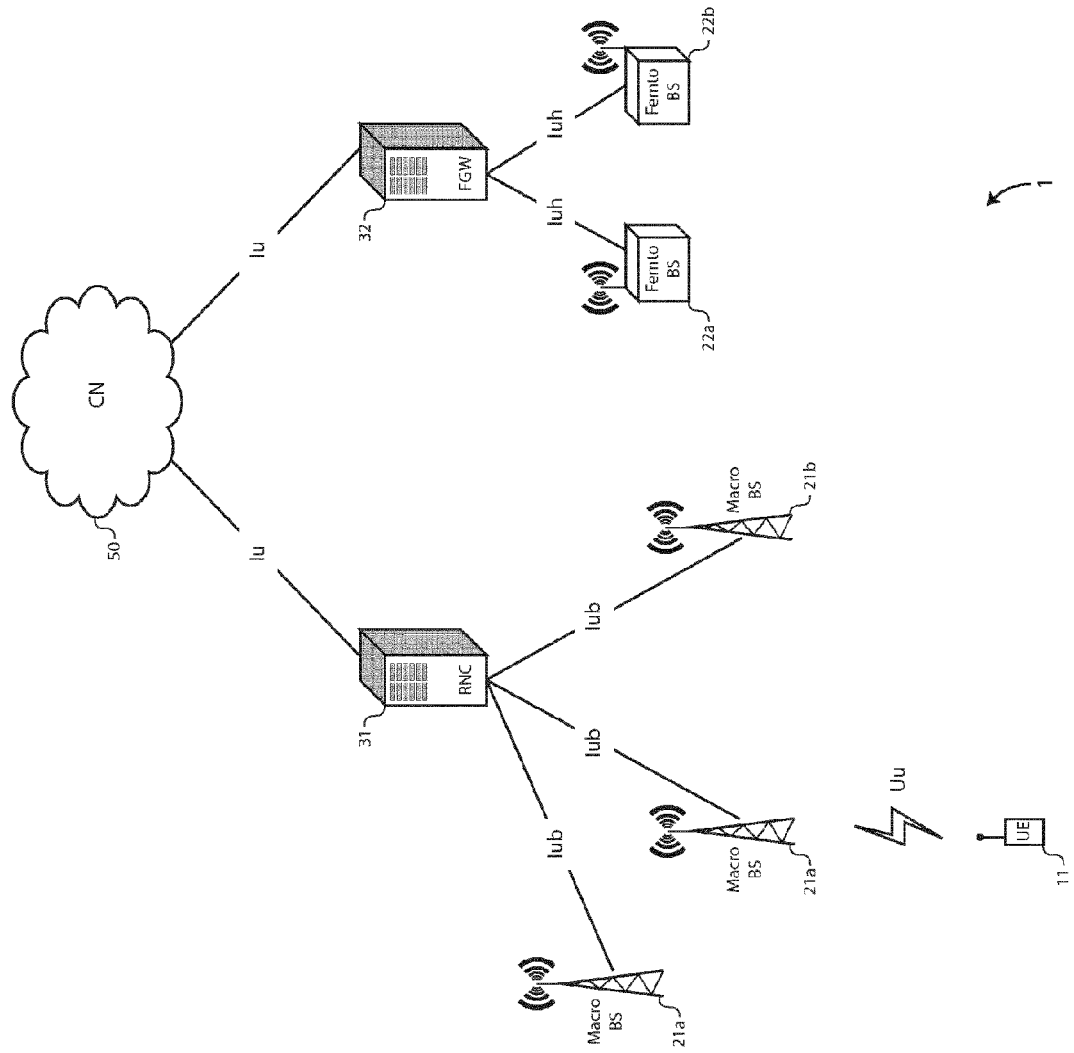
FIG. 1 represents a UMTS mobile network.

FIG. 1 illustrates a UMTS mobile network 1 making use of WCDMA radio access technology. A UE 11 roams through the mobile network 1. Macro base stations 21 are provided operating respective macro cells. A number of such base stations are provided, which are distributed geographically in order to provide a wide area of coverage to the UE 11. When the UE 11 is within the radio coverage area of a particular macro cell then radio communication may be established with the corresponding base station operating the particular macro cell over an associated radio link conforming to the Uu communication interface. Of course, it will be appreciated that FIG. 1 illustrates a small subset of the total number of UEs and base stations that may be present in a typical mobile communication system.

An RNC 31 controls the operation of the base stations 22 and of the UE 11 in order to efficiently manage the wireless communication network 10. The RNC 31 communicates with the base stations over a backhaul communication link conforming to the Iub communication interface, and further with the UE 11 via their respective radio link.

The RNC 31 is operable to communicate with a Core Network (CN) 41, and to route traffic via circuit-switched and packet-switched networks. Hence, a mobile switching Center (MSC, not shown) is provided within the CN 41 with which the RNC 31 may communicate over a communication link conforming to Iu-CS communication interface. The MSC then communicates with a circuit-switched network, such as a Public Switched Telephone Network (PSTN). Likewise, the RNC 31 communicates with a Serving General packet radio service Support Node (SGSN, not shown) over a communication link conforming to Iu-Ps communication interface. The SGSN is further coupled to a Gateway General packet radio service Support Node (GGSN, not shown), which communicates with a packet-switch network, such as the Internet.

In addition, there are provided femto base stations 22, each of which operates a femto cell in the vicinity of a building within which the associated femto base station is installed. The femto cells provide local communication coverage for a user in the vicinity of those buildings. The femto base stations 22 typically utilize a broadband Internet connection (e.g., xDSL, cable) for traffic backhauling. The femto base stations 22 communicate with a femto cell gateway 32 (FGw) via a backhaul communication link conforming to the Iuh communication interface.

The femto cell gateway 32 sits between the femto base stations 22 and the CN 31, and performs the necessary translations to ensure the femto base stations 22 appear as a RNC to the MSC. The femto base stations 22 talk to the femto cell gateway 32, and the femto cell gateway 32 talks to the CN 31 (MSC for circuit-switched communications, SGSN for packet-switched communications).

The femto cell gateway 32 comprises a security gateway that terminates large numbers of encrypted data connections from hundreds of thousands of femto base stations, and a signaling gateway which aggregates and validates the signaling traffic, authenticates each femto base stations and interfaces with the CN 31.

The femto base stations 22 are low-power, low-cost, self organizing base stations that provide private or public mobile communication services in a residential or business environment. In contrast to current macro cell approaches where complex and highly reliable base stations are deployed to strategic locations decided by the network owner, the femto base stations may be provided locally by customers for their own use, but are also a cost effective solution for operators to provide low-cost hot spot coverage and rural coverage.

To reduce the cost of the femto base stations and to reduce complexity and interference effects of the femto cells on macro cells, the transmission power of the femto base station is relatively low in order to restrict the coverage area of the femto cell to a range of tens of meters or less. The femto base stations have extensive auto-configuration and self-optimization capability to enable a simple plug-and-play deployment. As such, they are designed to automatically integrate themselves into an existing macro cellular wireless network. In addition, the femto base stations contain some functionalities traditionally provided by the RNC, such as the Radio Resource Control (RRC) functions.

Further small base stations, such as pico, metro or micro base stations, may be provided to operate pico, metro or micro cells. Pico, metro or micro cells are typically provided by network operators in areas of high traffic or poor coverage.

Figure 2:
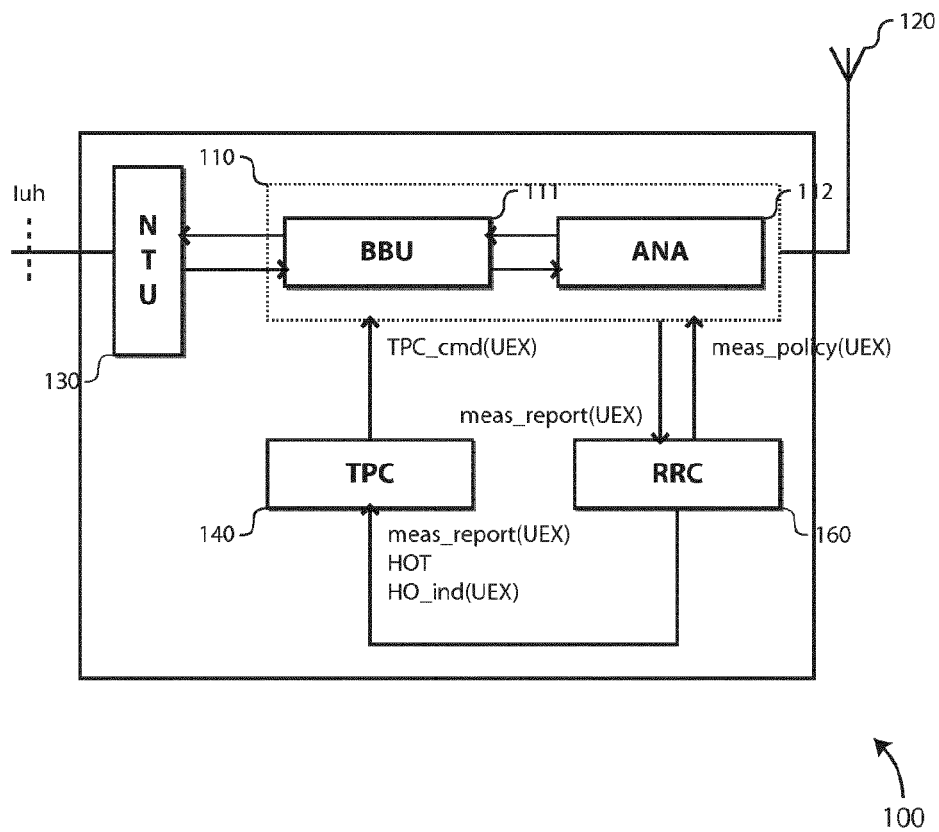
FIG. 2 represents a home base station as per the present invention.

There is seen in FIG. 2 further details about a femto base station 100 configured to operate a femto cell, and comprising a transmit power controller as per the present invention.

The femto base station 100 comprises the following functional blocks:

- a transceiver 110 comprising a digital base-band unit 111 (or BBU) and an analog band-pass unit 112 (or ANA),
- a network termination unit 130 (or NTU),
- a radio resource controller 140 (or RRC), and
- a transmit power controller (or TPC) 150.

The network termination unit 130 is coupled to the digital base-band unit 111; the digital base-band unit 111 is coupled to the analog band-pass unit 112; the analog band-pass unit 112 is coupled to an external or internal antenna 120. The radio resource controller 140 and the transmit power controller 150 are coupled to the transceiver 110. The transmit power controller 140 is further coupled to the radio resource controller 150.

Further functional blocks and/or further couplings and interactions that are not relevant to the present description have been voluntarily omitted for improved clarity.

The transceiver 110 is configured to establish and operate radio communication channels with UEs under control of the radio resource controller 150.

The digital base-band unit 111 is for digitally processing the received and transmit data symbols. The digital base-band unit 111 implements the necessary protocol suites for issuing, terminating or relaying signaling packets (or control packets), and for relaying user data traffic.

The analog band-pass unit 112 is for modulating, amplifying and shaping the transmit signal that ultimately feds the antenna 130, and for filtering, amplifying with as little noise as possible and demodulating the received signal from the antenna 130. The analog band-pass 112 unit can be merged with the digital base-band unit 111 into one single unit.

The network termination unit 130 accommodates the appropriate Medium Access Control (MAC) and Physical transport (PHY) layers for connecting through a broadband connection to a femto cell gateway, as well as some frame dispatching logic for routing the incoming/outgoing frames towards the appropriate Input/Output (I/O) ports.

The radio resource controller 140 is for assigning and managing downlink and uplink radio resources used by the transceivers 110 and the respective UEs for radio communication over the air interface, that is to say a set of code and/or frequency resources assigned to the respective radio bearers for transport of user traffic.

The radio resource controller 140 further configures the active UEs with a measurement policy (see "meas_policy (UEX)" in FIG. 2). Presently, the UEs are configured to periodically report measurements of the serving and neighboring cells (see "meas_report(UEX)" in FIG. 2). The measurement report typically comprises Ec/No measurements performed on the Primary Common PIlot CHannel (P-CPICH) of the serving and neighboring cells. Ec/No stands for the received energy per chip divided by the power density in the band, and is equal to the Received signal Code Power (RSCP) measurements, meaning the received power on one code measured on the P-CPICH of the serving or neighboring cell, divided by the received wide band power, including thermal noise and noise generated in the receiver, within the bandwidth defined by the receiver pulse shaping filter.

The radio resource controller 140 compares the periodic measurement reports with the respective measurement event thresholds so as to detect that a particular neighboring cell is fulfilling a particular handover condition.

For instance, a particular handover condition comprises a positive offset value OFF1, a Time-To-Trigger (TTT) value TTT1, and possibly an hysteresis value HYS1. The handover condition is fulfilled by a particular neighboring cell if the receive strength or quality of a reference signal from that neighboring cell is measured as being persistently better than the receive strength or quality of a reference signal from the current serving cell by the positive offset amount OFF1 and for TTT1 seconds. The hysteresis HYS1 prevents excessive toggling between the entering and leaving handover condition.

Upon fulfillment by a particular UE of a handover condition for a particular target cell, the radio resource controller 140 makes a handover decision and initiates the necessary signaling exchanges with the target RNC via the femto cell gateway for carrying out a soft or hard handover of the particular UE from the femto cell towards the target cell.

The radio resource controller 140 is further configured to determine a reference signal strength or quality threshold HOT for outbound handovers within the femto cell. The reference threshold HOT is determined by averaging the receive signal strength or quality levels as reported by the UEs when a handover condition for an outbound handover is met by the UEs.

The reference threshold HOT, together with the periodic measurements as reported by the active UEs, are forwarded to the transmit power controller 150 for further handling (see "HOT" and "meas_report(UEX)" in FIG. 2).

The transmit power controller 150 is for controlling the uplink transmit power of the active UEs (see "TPC_cmd (UEX)" in FIG. 2).

The transmit power controller 150 implements the aforementioned closed-loop power control mechanism designed for maintaining the SNIR at a certain target SNIR.

In addition, the transmit power controller 150 is further configured to keep track of the current receive signal strength or quality level in the femto cell for the active UEs, and to detect that the current receive signal strength or quality level of a particular UE in the femto cell is past an handover anticipation threshold HOA, which is the sum of the reference threshold HOT supplied by the radio resource controller 140 and a positive anticipation offset OFF2, meaning that a handover towards a target cell is likely to take place in the near-future.

Thereupon, the transmit power controller 150 enters an ad-hoc uplink power control regime for that particular UE, and issues TPC commands to that particular UE so as a certain uplink transmit power target P_target is met when the handover eventually takes place. The ad-hoc uplink power control regime will be further elucidated with regard to FIG. 5.

The uplink transmit power target P_target is determined according to an estimate of the downlink path loss the particular UE is expected to incur within the target cell upon handover execution. P_target can be estimated from UE measurements of the target cell, or from own measurements carried out by the femto base station 100 itself. This is done similar to the power initialization in the open loop power control procedure.

The transmit power controller 150 is further configured to monitor the actual execution of an handover for a particular UE once the ad-hoc uplink power control regime is in force for that particular UE. Purposely, the transmit power controller 150 is supplied with a handover notification message from the radio resource controller 140 whenever a handover procedure completes for a particular UE, or alternatively whenever a handover procedure is initiated for a particular UE (see "HO_ind(UEX)" in FIG. 2). The transmit power controller 150 triggers a supervision timer THO once the anticipation threshold HOA is passed for a particular UE, and stops the supervision timer THO when the handover procedure completes for that particular UE, or alternatively when the handover procedure starts for that particular UE. If the supervision timer THO expires then no handover took place for that particular UE, and the legacy closed-loop power control mechanism is restored.

Figure 3:
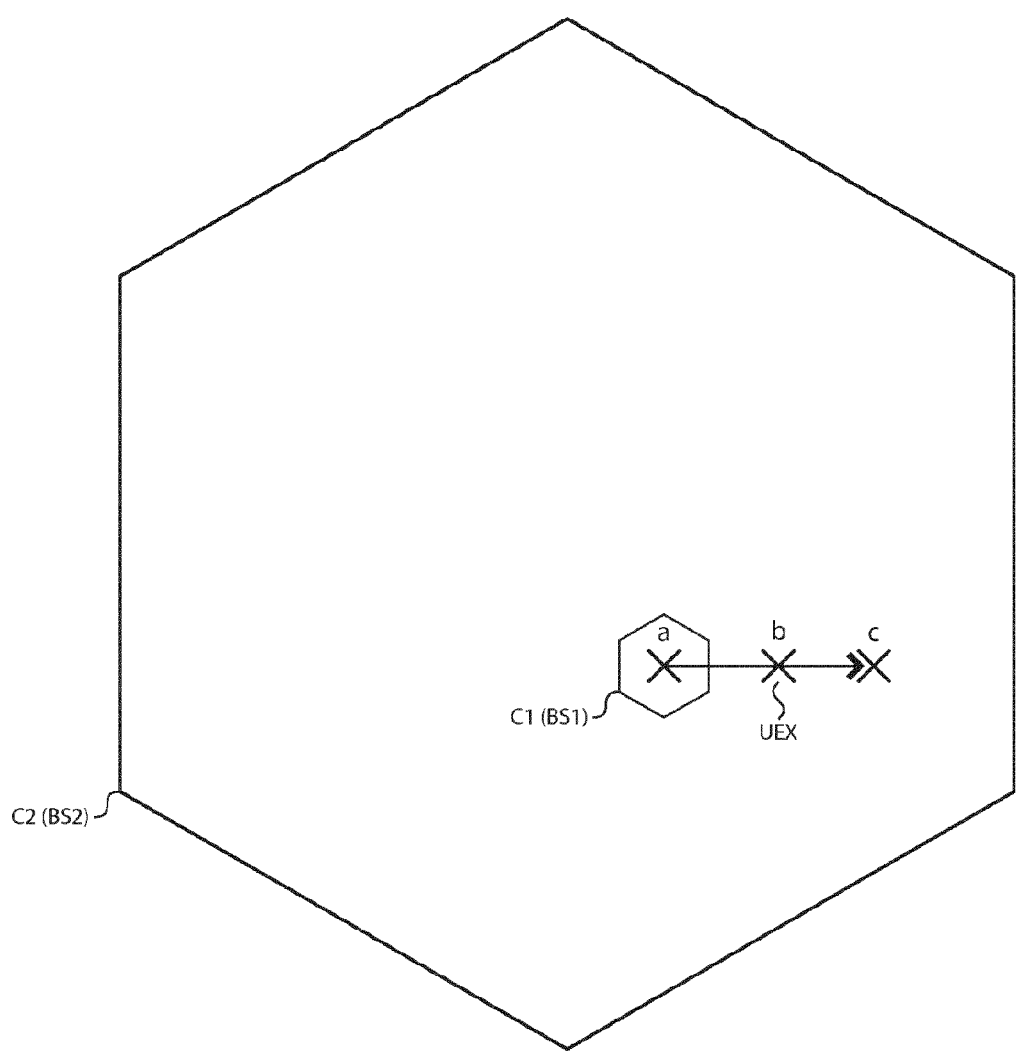
FIG. 3 represents a radio coverage area comprising a macro cell and a pico cell.

There is seen in FIG. 3 a particular radio coverage area of a mobile network comprising:
- a femto cell C1, which is operated by a femto base station BS1, and
- a macro cell C2, which is operated by a macro base station BS2.

The cells C1 and C2 may share the same frequency band, in which case soft or hard handovers are possible between the cells C1 and C2, or may be assigned non-overlapping frequency bands, in which case only hard handovers are allowed.

A UE UEX establishes a communication session at position a, within the coverage area of the femto cell A.

The UE UEX next moves towards position c while the communication session is on-going.

At position b, the received pilot signal from macro cell C2 is stronger than the received pilot signal from femto cell C1. Provided that the difference between the two received signals' strength is beyond some configured handover margin and stays there for a minimum of a TTT period, an outbound handover is triggered for handing over the on-going session towards the macro cell C2.

Figure 4:
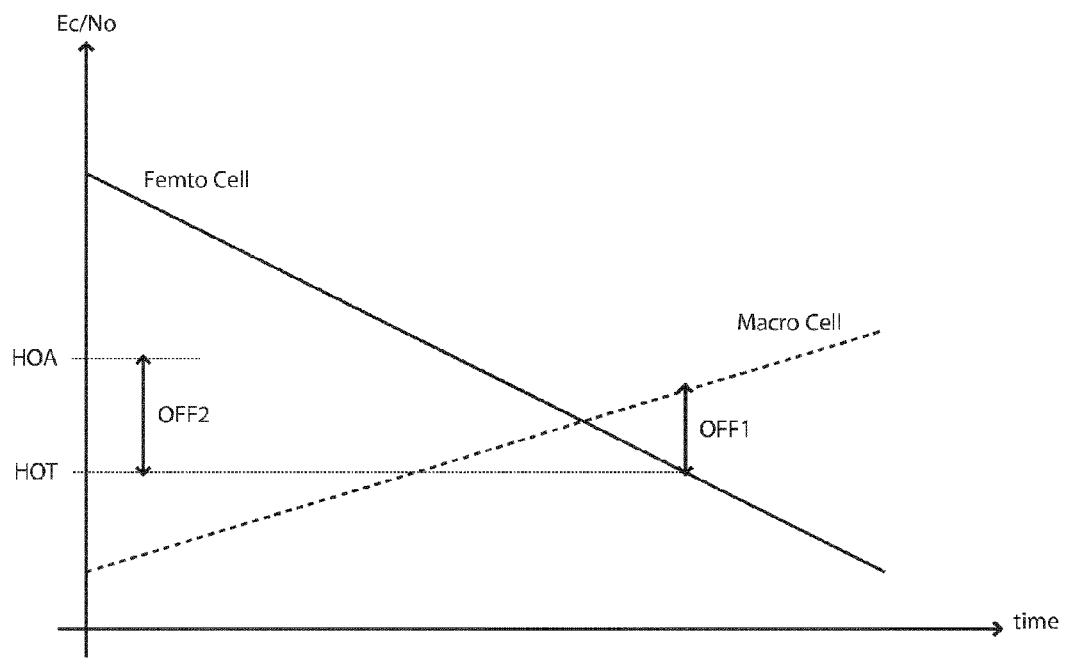
FIG. 4 represents a plot of a receive signal quality for a UE moving outside a femto cell, as well as respective handover and anticipation thresholds.

There is seen in FIG. 4 the chip-to-noise energy ratio Ec/No of a pilot signal broadcast within the femto cell C1 and the neighboring macro cell C2 as measured by the UE UEX while it leaves the femto cell C1.

Once the Ec/No value of the femto cell C1 falls below that of the macro cell C2 by at least a positive offset OFF1 value and for TTT1 seconds, the handover occurs. Over the time, the femto base station BS1 is capable of estimating an average Ec/No level at which handovers are typically performed. This is denoted by a handover reference threshold HOT.

To have an accurate estimation of the handover threshold value HOT, the femto base station BS1 can calculate the moving average of HOT based on the handover observations over time:

$$HOT(n) \leftarrow HOT(n-1) + \alpha(HOT(n) - HOT(n-1)) \quad (2),$$

wherein HOT(n) denotes the nth handover observation, and $\alpha$ is an averaging coefficient ($0 < \alpha < 1$), where higher $\alpha$ values overwrites the older observations faster.

By introducing an anticipation handover threshold HOA as a potential handover threshold, the femto base station BS1 can be prepared to face a likely handover. The anticipation handover threshold HOA is defined as:

$$HOA = HOT + OFF2 \quad (3),$$

wherein OFF2 is a second positive anticipation offset.

The femto base station BS1 monitors the received Ec/No of the active UEs. Once the value falls below the anticipation threshold value HOA, the femto base station BS1 records the current transmit power of the UE as P_start, and starts commanding the UE to increase its transmit power level so that, by the time of the hand-over, the UE is already on an appropriate power level P_target to communicate to the remote macro base station BS2. Since the femto base station BS1 can estimate the typical or average value of Ec/No at which handovers are performed, the threshold value HOA can be simply calculated by adding an anticipation offset value OFF2 to this value. Additionally, the target power level P_target does not need to be accurate as the finer power control mechanism after the handover (or the power initialization procedure using open loop power control in case of hard handover) will adjust any power offset.

Figure 5:
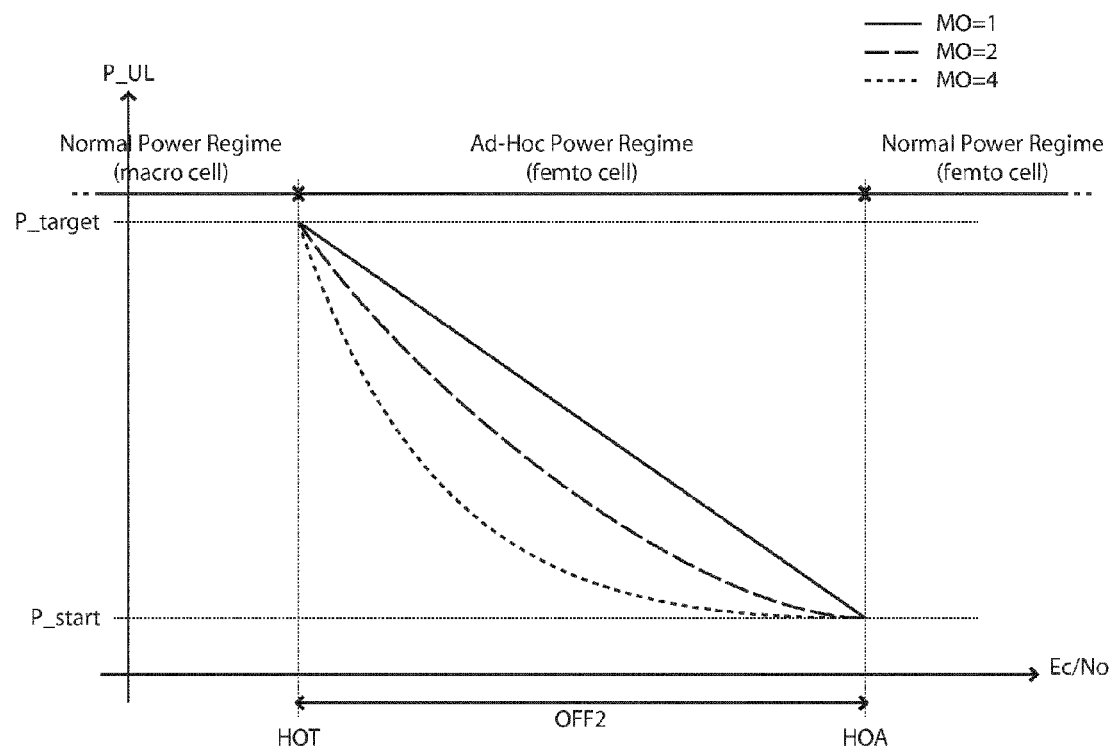
FIG. 5 represents a plot of the UE transmit power controlled as per the present invention.

There is plotted in FIG. 5 different uplink power control regimes as per the invention.

Once the UE's Ec/No is below the threshold value HOA, the femto base station BS1 starts to adapt the UE's transmit power appropriately.

In its simplest form, this power adaptation can be a linear function of the receive Ec/No as measured by the UE that results in the uplink transmit power to be at P_target when the receive Ec/No equals HOT=HOA−OFF2, that is to say when the handover is expected to take place:

$$P\_UL = \begin{cases} \text{Normal Power Control Regime if } \frac{Ec}{No} > HOA \\ \left(\frac{P_{target} - P_{start}}{OFF2}\right) \cdot \left(HOA - \frac{Ec}{No}\right) + P_{start} \text{ if } \frac{Ec}{No} \leq HOA \end{cases} \quad (4)$$

wherein P_UL denotes the uplink transmit power. This first option is plotted in FIG. 5 as a plain line.

While this provides a first order linear mapping of the UE's transmit power from P_start to P_target when Ec/No is decreasing from HOA to HOT=HOA−OFF2 respectively, it might be desirable to have higher order mapping. This is especially helpful as, in this case, the UE's transmit power remains lower when compared to the first order mapping. This would evidently reduce the total interference level and avoid over provisioning of all other UE's transmit power (note that all other UEs would respectively adapt their power to sustain their own SNIR values). To account for higher order mappings, equation (4) can be modified as:

$$P\_UL = \begin{cases} \text{Normal Power Control Regime if } \frac{Ec}{No} > HOA \\ \left(\frac{P_{target} - P_{start}}{OFF2^{MO}}\right) \cdot \left(HOA - \frac{Ec}{No}\right)^{MO} + P_{start} \text{ if } \frac{Ec}{No} \leq HOA \end{cases} \quad (5)$$

wherein MO denotes the Mapping Order (MO). This second option is plotted as two dashed curves in FIG. 5 with MO set to 2 and 4 respectively.

It is to be noticed that the effective transmit power used by a UE in the ad-hoc power control regime is a staircase version of the plotted curves as the UE step-wise adjusts its transmit power upon receipt and interpretation of TPC commands from the base station(s), that is to say at specific time instances and at the specified power granularity.

The solution works well with both hard and soft handovers. With hard handovers, the UE receives the power control commands only from the femto cell C1 and therefore the power is adapted in a desired way. With soft handovers however, the UE receives the power control commands both from the macro cell C1 and the femto cell C2 but will consider the more conservative power control commands (the one resulting in lower transmit power), which is very likely to be the femto cell commands.

The solution can be optionally extended to include a timer that is activated immediately after the received Ec/No of the UE falls below HOA threshold. If no handover occurs after a pre-defined time period T_handover, the power control operation can be set back to its normal procedure. Further, the received Ec/No at the time of expiration of the timer is recorded as LHOA. This will avoid UE to over-provision the transmit power if the handover does no occur within a certain time period (e.g., the case when the femto cell user gets close to the femto cell coverage border and does not move from there any further).

If the ad-hoc power control mechanism is cancelled when the received Ec/No of the UE is below HOA threshold due to expiration of the timer T_handover, it can be reactivated again if:

$$\frac{Ec}{No} < LHOA - RT, \quad (6)$$

wherein RT is a reactivation threshold.

In other words, the algorithm is reactivated (after being canceled due to the timer expiration) if the received Ec/No of the UE drops further and falls bellow LHOA-RT.

OFF2, T_handover and RT parameters are design parameters that can be fine-tuned by the manufacturer.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A method for controlling the transmit power of a mobile station served by a small cell, wherein the method comprises detecting a measurement event anticipating the forthcoming fulfillment of a handover condition towards a neighboring macro cell by the mobile station, and thereupon step-wise increasing the transmit power level of the mobile station so as to reach a transmit power target when the handover condition is eventually fulfilled by the mobile station.

2. The method according to claim 1, wherein the handover condition is a condition whereby the macro cell is measured as being offset better than the small cell by a first positive handover offset, thereby yielding a reference receive signal strength or quality threshold in the small cell for handover towards the macro cell, and the measurement event is a measurement event whereby a current receive strength or quality level for the mobile station in the small cell was measured as being below a handover anticipation threshold which is the sum of the reference receive signal strength or quality threshold and a second positive anticipation offset.

3. The method according to claim 1, wherein the transmit power target is for compensating for an estimated downlink path loss for the mobile station in the macro cell.

4. The method according to claim 3, wherein the transmit power target is determined by measuring a receive signal strength of a reference pilot signal broadcast within the macro cell at a nominal downlink transmit power.

5. The method according to claim 1, wherein the step-wise increase of the transmit power is a monotonically-decreasing function of a current receive strength or quality level for the mobile station in the small cell.

6. The method according to claim 5, wherein the step-wise increase of the transmit power corresponds to a linear power increase from an initial transmit power used by the mobile station in the small cell when the measurement event is detected up to the transmit power target.

7. The method according to claim 5, wherein the step-wise increase of the transmit power corresponds to a second or higher order polynomial power increase from an initial transmit power used by the mobile station in the small cell when the measurement event is detected up to the transmit power target.

8. The method according to claim 1, wherein the method further comprises withdrawing the increase of the transmit power level for the mobile station when no handover towards the macro cell took place for the mobile station during a handover confirmation time period triggered upon detection of the measurement event.

9. A transmit power controller for controlling the transmit power of a mobile station served by a small cell, and configured to detect a measurement event anticipating the forthcoming fulfillment of a handover condition towards a neighboring macro cell by the mobile station, and thereupon to step-wise increase the transmit power level of the mobile station so as to reach a transmit power target when the handover condition is eventually fulfilled by the mobile station.

10. The radio access point comprising a transmit power controller according to claim 9, and configured to operate the small cell.

11. The radio access point according to claim 10, wherein the radio access point is a femto base station.

12. The radio access point according to claim 10, wherein the radio access point is a pico, metro or micro base station.

* * * * *